Oct. 14, 1958　　　　　H. BOKAIR　　　　　2,856,598

WARNING SIGNAL DEVICE FOR AUTOMOTIVE VEHICLES

Filed Jan. 4, 1957

INVENTOR
*Harry Bokair*
BY
ATTORNEY

United States Patent Office 2,856,598
Patented Oct. 14, 1958

2,856,598

WARNING SIGNAL DEVICE FOR AUTOMOTIVE VEHICLES

Harry Bokair, Brooklyn, N. Y.

Application January 4, 1957, Serial No. 632,589

4 Claims. (Cl. 340—366)

The present invention relates to a warning signal particularly designed to prevent collision and act as a safety factor for automotive vehicles in the case of stoppage for repair or replacement of tires on roads.

It has been found particularly difficult at the present time on high speed State or main roads and even on highways to protect drivers and the vehicles if they must make emergency stops on the side edge or even off the edge of the road for the purpose of engine repair or replacement of tires and many disastrous accidents are caused with damage to property and injury or loss of life because of inability to give sufficient warning to vehicles which follow along at relatively high speed.

It is among the objects of the present invention to provide a warning signal which will be readily available to the driver of the car and which may be immediately attached to the vehicle without necessity of special connections or independent batteries and which will give sufficient warning to following vehicles to eliminate or decrease the possibility of accident or collision.

Another object is to provide a substantially automatic signal warning device which will require no equipment for its operation other than is already available in the automotive vehicle and which may be readily applied by either male or female drivers without getting out of the car or making a special installation or connections.

Still further objects and advantages will appear in the more detailed description set forth below, it being understood, however, that this more detailed description is given by way of illustration and explanation only and not by way of limitation, since various changes therein may be made by those skilled in the art without departing from the scope and spirit of the present invention.

In accomplishing the above objects it is found most satisfactory to provide a device which may be readily suspended upon the side of an automotive vehicle and particularly from the window thereof and which will be readily plugged into the cigarette lighter and which will give a strong, vivid signal, preventing collision and warning the oncoming driver that a vehicle has been stopped.

In the preferred form of the invention there is a box with an illuminated "stop" sign thereon having an electric flasher lamp therein illuminating said "stop" sign and with a mercury switch and microswitch combination which will be vibrated upon operation of the motor of the vehicle sufficiently to give a flashing signal.

The microswitch and the mercury switch should be so adjusted that the flashing signal is obtained with the normal vibration of a running automotive engine which will cause a rolling or vibrating movement in view of the springs and tires, particularly when the car is being worked upon.

With the foregoing and other objects in view, the invention consists of the novel construction, combination and arrangement of parts as hereinafter more specifically described, and illustrated in the accompanying drawings, wherein is shown an embodiment of the invention, but it is to be understood that changes, variations and modifications can be resorted to which fall within the scope of the claims hereunto appended.

In the drawings wherein like reference characters denote corresponding parts throughout the several views.

Figure 1:
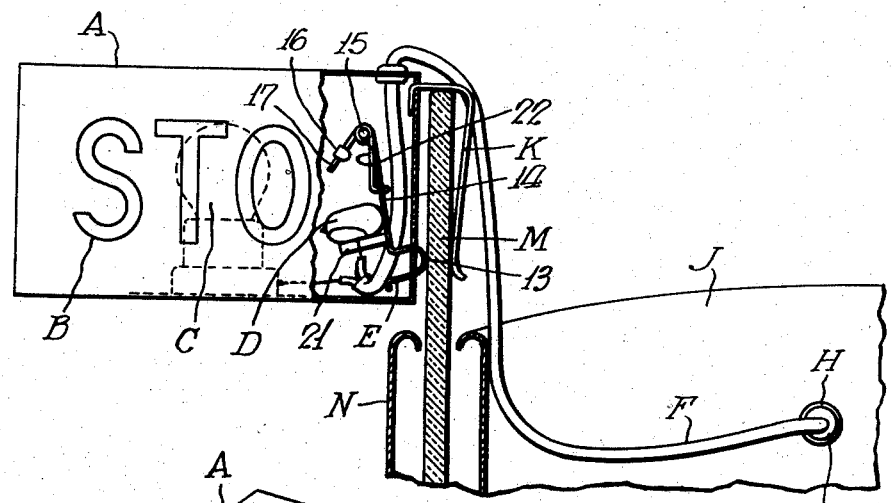
Figure 1 is a front elevational view partly in section to show the combination of the present invention.
Figure 2:
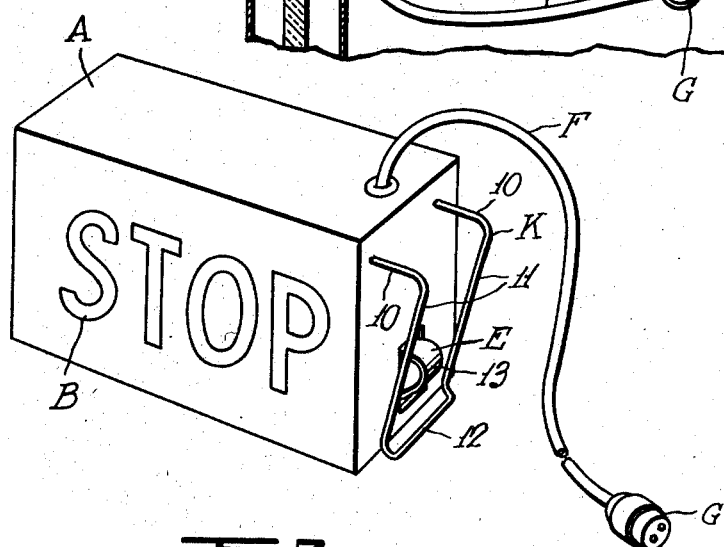
Fig. 2 is a side perspective view of the unit removed from the motor vehicle.
Figure 3:
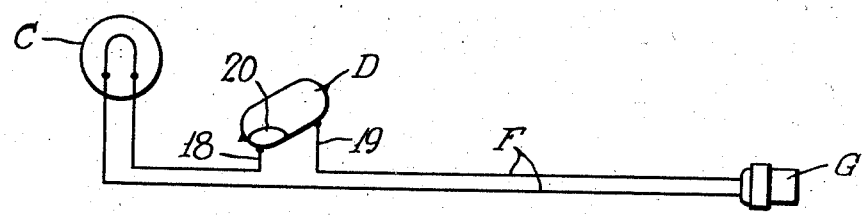
Fig. 3 is a diagrammatic layout of the circuit system.

Referring to Fig. 1 there is shown a signal box A having a "stop" sign B of red transparent material which includes a flasher or other type of lamp C associated with a mercury switch D and a delicately balanced microswitch E carrying said mercury switch D.

From the box extends a cable connection F to the plug G which in turn extends to the receptacle H for the cigarette lighter on the dashboard J of the vehicle.

The box will be clipped by means of the resilient clip member K so that it will be almost pendulously suspended from the side of the window pane and which is elevated partly out of the recess end in the side of the automotive vehicle or in the door of the automotive vehicle.

It will be noted that the clip K has horizontal arms 10 and inturned vertical arms 11 and the outturned case 12 forming a U structure which will suspend the box A which is much heavier so that the loop 13 of the microswitch lightly presses the outside face 14 of the window pane M. This suspension will result in even a slight movement of the car body causing a movement of the microswitch E and flashing of the signal and cutting on and off of the current from the lighter socket H.

The microswitch loop 13 is suspended by the vertical member 14 from the pivot 15 and it has a weight 16 which aids in the vibration effect. This weight is adjustable on the arm 17. The mercury switch D has the connections 18 and 19 and the mercury pull 20 and it is mounted upon a platform 21 which will also act as a weight to give a pendulous effect and cause a vibration under slight motor action of microswitch E. The spring member 22 which loops over the arm 14 is so adjusted as to aid in this vibration effect.

As soon as the car stops for repairs, without getting out of the car the box may be applied by means of the clip K with the cable F extending to the plug-in G. The window pane 14 in the door or side of the vehicle N is partly elevated to receive the clip K. The device G is then plugged in to the dashboard. The vibration of the motor or merely working on the car with the springs and tires will cause sufficient vibration to cause a flashing of a light and assure that there will be rapid and continuous flashing of the "stop" signal B when the car is stopped.

While there has been herein described a preferred form of the invention, it should be understood that the same may be altered in details and in relative arrangement of parts within the scope of the appended claims.

Having now particularly described and ascertained the nature of the invention, and in what manner the same is to be performed:

What is claimed is:

1. An automobile danger signal of the type having a connecting plug to plug into the cigarette lighter receptacle, comprising a box having an illuminatable sign, an inside electric light illuminating said sign, an outside clip to clip onto a vehicle window and a balanced micro-mercury switch combination connected by electrical wiring to the plug and to said light subject upon vibration of the switch to continuously flash on and off said switch combination including a resilient lever element pressing on outside face of window and on the opposite side of the window from the side contacted by the clip.

2. An automobile danger signal of the type having a connecting plug to plug into the cigarette lighter receptacle, comprising a box having an illuminatable sign, an inside electric light illuminating said sign, an outside clip to clip onto a vehicle window and a balanced micro-mercury switch combination connected by electrical wiring to the plug and to said light subject upon vibration of the switch to continuously flash on and off, said signal having a connection to the cigarette lighter socket on the dashboard of the automobile, said switch combination including a resilient lever element pressing on outside face of window and on the opposite side of the window from the side contacted by the clip.

3. An automobile danger signal of the type having a connecting plug to plug into the cigarette lighter receptacle, comprising a box having an illuminatable sign, an inside electric light illuminating said sign, an outside clip to clip onto a vehicle window and a balanced micromercury switch combination connected by electrical wiring to the plug and to said light subject upon vibration of the switch to continuously flash on and off, said clip consisting of a U shaped clip to suspend said box pendulously so that it will vibrate upon operation of the automotive engine or working upon the car.

4. An automatic safety signal flashing light for suspension on the partly lowered side window of an automobile comprising an electric light, a box carrying the light on electrical circuit to the light involving a lightly balanced mercury switch, a resilient outwardly and downwardly projecting switch lever to move the switch, contacting the outside face of the window, a clip carrying the box contacting the inside face of the window and a source of electrical energy for said circuit, said lever operating said switch to on and off position upon vibration of the automobile.

References Cited in the file of this patent
UNITED STATES PATENTS

| | | |
|---|---|---|
| 1,305,352 | Gettell | June 3, 1919 |
| 2,638,584 | Fortney | May 12, 1953 |